US006609131B1

(12) United States Patent
Zait et al.

(10) Patent No.: US 6,609,131 B1
(45) Date of Patent: Aug. 19, 2003

(54) PARALLEL PARTITION-WISE JOINS

(75) Inventors: Mohamed Zait, Sunnyvale, CA (US); Beniot Dageville, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 09/406,482

(22) Filed: Sep. 27, 1999

(51) Int. Cl.$^7$ .............................................. G06F 17/00
(52) U.S. Cl. ........................... 707/102; 707/3; 707/100
(58) Field of Search ....................... 707/1–10, 100–103, 707/200–206

(56) References Cited

U.S. PATENT DOCUMENTS

| | | | | |
|---|---|---|---|---|
| 5,675,791 A | * | 10/1997 | Bhide et al. .................. 707/10 |
| 5,970,495 A | * | 10/1999 | Baru et al. .................... 707/10 |
| 6,003,036 A | * | 12/1999 | Martin ......................... 707/100 |
| 6,092,062 A | * | 7/2000 | Lohman et al. ............... 707/2 |
| 6,112,198 A | * | 8/2000 | Lohman et al. ............... 707/3 |
| 6,223,182 B1 | * | 4/2001 | Agarwal et al. ............. 707/102 |
| 6,240,428 B1 | * | 5/2001 | Yeung et al. ................. 707/206 |
| 6,263,331 B1 | * | 7/2001 | Liu et al. ....................... 707/4 |

* cited by examiner

*Primary Examiner*—Kim Vu
*Assistant Examiner*—Joon Hwan Hwang
(74) *Attorney, Agent, or Firm*—Brian D. Hickman; Hickman Palermo Truong & Becker LLP

(57) ABSTRACT

Techniques are disclosed for expanding the concept of partitioning in variety of ways. In particular techniques are provided for performing multiple-dimension partitioning. In multiple-dimension partitioning, a database object is divided into partitions based on one criteria, and each of those resulting partitions is divided into sub-partitions based on a second criteria. The process of partitioning partitions based on different criteria may be repeated across any number of dimensions. Entirely different partitioning techniques may be used for each level of partitioning. The database server takes advantage of partitions when processing queries that include joins. In particular, techniques are provided for performing a full parallel partitioned-wise join, and a partial parallel partition-wise join. In a partial parallel partition-wise join, one of the join tables is statically partitioned on the join key and another join table is dynamically partitioned in a way that corresponds to the partition criteria of the statically partitioned table. In a full parallel partition-wise join, both of the tables involved in the join have already been statically partitioned based on the same criteria. The join operation is performed in parallel in a way that takes advantage of that static partitioning.

10 Claims, 4 Drawing Sheets

PARALLEL PARTITION-WISE JOINS

FIELD OF THE INVENTION

The present invention relates to computer systems and, more particularly, to techniques for performing joins between objects within computer systems.

BACKGROUND OF THE INVENTION

In conventional relational database tables, rows are inserted into the table without regard to any type of ordering. Consequently, when a user submits a query that selects data from the table based on a particular value or range of values, the entire table has to be scanned to ensure that all rows that satisfy the criteria are identified. Partitioning is a technique that, in certain situations, avoids the need to search an entire table (or other database object).

With partitioning, an object, such as a database table, is divided up into sub-tables, referred to as "partitions". The most common form of partitioning is referred to range partitioning. With range partitioning, each individual partition corresponds to a particular range of values for one or more columns of the table. For example, one column of a table may store date values that fall within a particular year, and the table may be divided into twelve partitions, each of which corresponds to a month of that year. All rows that have a particular month in the date column would then be inserted into the partition that corresponds to that month. In this example, partitioning the table will increase the efficiency of processing queries that select rows based on the month contained in the date column. For example, if a particular query selected all rows where months equals January, then only the partition associated with the month of January would have to be scanned.

Typically, the criteria used to partition a database object is specified in the statement that creates the database object. For example, the following Structured Query Language SQL) statement creates a table "sales" that is range partitioned based on date values contained in a column named "saledate":

create table sales
  (saledate DATE,
  productid NUMBER, . . . )
  partition by range (saledate)
    partition sal94Q1 values less than to_ate (yy-mm-dd, '94-04-01')
    partition sal94Q2 values less than to_ate (yy-mm-dd, '94-07-01')
    partition sal94Q3 values less than to_ate (yy-mm-dd, '94-10-01')
    partition sal94Q4 values less than to_ate (yy-mm-dd, '95-01-01')

Execution of this statement creates a table named "sales" that includes four partitions: sal94Q1, sal94Q2, sal94Q3, and sal94Q4. The partition named sal94Q1 includes all rows that have a date less than 94-04-01 in their saledate column. The partition named sal94Q2 includes all rows that have a date greater than or equal to 94-04-01 but less than 94-07-01 in their saledate column. The partition named sal94Q3 includes all rows that have a date greater than or equal to 94-07-01 but less than 94-10-01 in their saledate column. The partition named sal94Q4 includes all rows that have a date greater than or equal to 94-10-01 but less than 95-01-01 in their saledate column.

When a database server receives a request to perform an operation, the database server makes a plan of how to execute the query. If the operation involves accessing a partitioned object, part of making the plan involves determining which partitions of the partitioned object, if any, can be excluded from the plan (i.e. which partitions need not be accessed to execute the query). The process of excluding partitions from the execution plan of a query that accesses a partitioned object is referred to as "partition pruning".

Unfortunately, conventional pruning techniques can only be applied to a limited set of statements. For example, the database server can perform partition pruning when the statement received by the database server explicitly limits itself to a partition or set of partitions. Thus, the database server can exclude from the execution plan of the statement "select * from sales PARTITION(sal94Q1)" all partitions of the sales table other than the sal94Q1 partition.

The database server can also perform partition pruning on statements that do not explicitly limit themselves to particular partitions, but which select data based on the same criteria that was used to partition the partitioned object. For example, the statement:

select * from sales where saledate between (94-04-01) and (94-07-01) does not explicitly limit itself to particular partitions. However, because the statement limits itself based on the same criteria (saledate values) as was used to partition the sales table, the database server is able to determine, based on the selection criteria of the statement and the partition definitions of the table, which partitions need not be accessed during execution of the statement. In the present example, the database server would be able to perform partition pruning that limits the execution plan of the statement to sal94Q2.

Similarly, database servers can perform partition pruning for queries with WHERE clauses that (1) specify equalities that involve the partition key (e.g. where saledate=94-02-05), (2) include IN lists that specify partition key values (e.g. where saledate IN (94-02-05, 94-03-06)), and (3) include IN subqueries that involve the partition key (e.g. where salesdate in (select datevalue from T)).

Another form of partitioning is referred to as hash partitioning. According to hash partitioning, one or more values from each record are applied to a hash function to produce a hash value. A separate partition is established for each possible hash value produced by the hash function, and rows that hash to a particular value are stored within the partition that is associated with that hash value. Similar to range based partitioning, hash partitioning increases the efficiency of processing certain types of queries. For example, when a query selects all rows that contain a particular value in the column that is used to perform the hash partitioning, the database server can apply the value in the query to the hash function to produce a hash value, and then limit the scan of the table to the partition that corresponds to the hash value thus produced.

A table that is hash partitioned into four partitions may be created by the following statement:

create table sales
  (saledate DATE,
  productid NUMBER, . . . )
partition by hash (saledate)
partitions 4;

Similar to range partitions, hash partitions may be used for queries with WHERE clauses that (1) specify equalities that involve the partition key, (2) include IN lists that specify partition key values, and (3) include IN subqueries that involve the partition key. However, unlike range-based partitioning, partition pruning cannot be performed for statements with predicates that specify ranges of partition key values. Consequently, hash-based partitioning is often used when the nature of the partition key is such that range-based queries are unlikely, such as when the partition key is "social security number", "area code" or "zip code".

Due to the benefits that result from partition pruning, it is clearly desirable to provide techniques for performing partition pruning for a wider variety of statements.

SUMMARY OF THE INVENTION

Techniques are provided to expand the concept of partitioning in variety of ways. For example, both hash partitioning and range partitioning can be characterized as single-dimension partitioning because they use a single criteria to divide up the partitioned objects. One aspect of the invention is to perform multiple-dimension partitioning. In multiple-dimension partitioning, a database object is divided into partitions based on one criteria, and each of those resulting partitions is divided into sub-partitions based on a second criteria. The process of partitioning partitions based on different criteria may be repeated across any number of dimensions. In addition, entirely different partitioning techniques may be used for each level of partitioning. For example, database objects may be partitioned across one dimension using range-based partitioning, and each of those range-based partitions may be partitioned across another dimension using hash based partitioning techniques.

Another aspect of this invention relates to how the database server takes advantage of partitions when processing queries that include joins. In particular, techniques are provided for performing a full parallel partition-wise join, and a partial parallel partition-wise join. In a partial parallel partition-wise join, one of the join tables is statically partitioned on the join key and another join table is dynamically partitioned in a way that corresponds to the partitioning criteria of the statically partitioned table. In a full parallel partition-wise join, both of the tables involved in the join have already been statically partitioned on the join key based on the same criteria. The join operation is performed in parallel in a way that takes advantage of that static partitioning.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for partitioning and partition pruning are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

COMPOSITE PARTITIONING

Hash-based partitioning and range-based partitioning each have their strengths and weaknesses. For example, with range-based partitioning, it becomes necessary to add new partitions when newly arriving rows have partition key values that fall outside the ranges of existing partitions. Under these circumstances, adding a new partition may be accomplished by a relatively simple procedure of submitting an ADD PARTITION statement that specifies the range for the new partition. The data in the existing partitions would remain intact.

In contrast, all partition key values fall within existing partitions of a hash-partitioned table. However, it may be desirable to add new partitions to a hash-partitioned table, for example, to spread the data over a greater number of devices. Adding new partitions to a hash-partitioned table is an extremely expensive operation, since the data in the existing partitions has to be completely redistributed based on a new hash function.

Range-based partitions tend to be unevenly populated (skewed) relative to hash-based partitions. For example, in a month-partitioned table, a particular month may have ten times the sales of another month. Consequently, the partition containing the data for the particular month will contain ten times the data of the other month. In contrast, the volume of data within one hash-based partition of an object tends to stay approximately in sync with the volume of the other hash-based partitions of the object. According to one embodiment of the invention, a partitioning technique is provided in which the benefits of both hash and range-based partitioning may be achieved. The technique, referred to herein as composite partitioning, involves creating partitions of partitions. For example, a table may be partitioned using range-based partitioning to create a set of first-level partitions. A hash function may then be applied to each of the first-level partitions to create, for each first level partition, a set of second-level partitions. Further, the partitioning key used to create the partitions at one level may be different than the partitioning key used to create the partitions at other levels.

Figure 1:
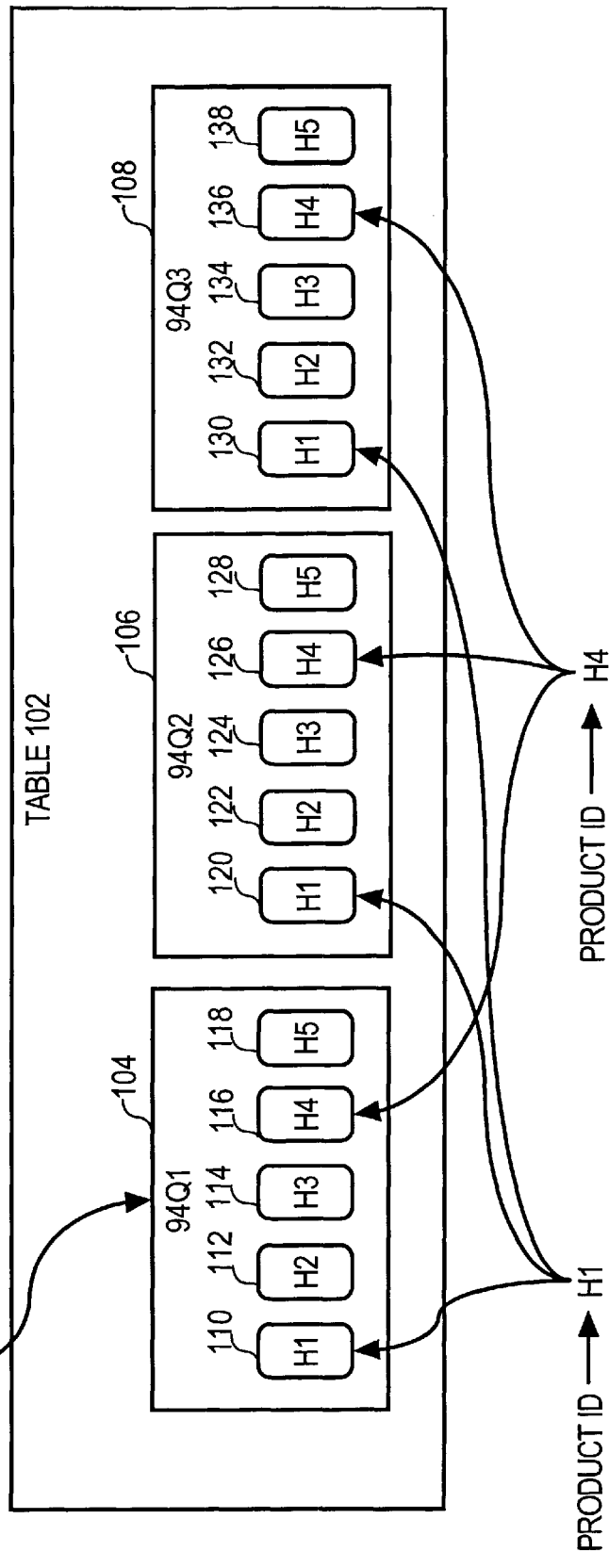
FIG. 1 is a block diagram illustrating a composite partitioned table according to an embodiment of the invention.

Referring to FIG. 1, it illustrates a table 102 that has been partitioned using composite partitioning. At the first level, table 102 has been partitioned using range-based partitioning on the first-level key "saledate". At the second level, each partition created at the first level has been partitioned using hash-based partitioning on the second-level partitioning key "productid".

When a row is inserted into a composite partitioned table, the database server must determine where to store the row. At each level of partition, the database server determines the appropriate partition for the row based on the partitioning rules that apply to that level, and the value that the row has for the partitioning key used at that level. For example, assume that a row is being inserted into table 102 and that within the row saledate='94-02-02' and productid=769. The appropriate first-level partition is selected by determining which of partitions 104, 106 and 108 is associated with the range into which '94-02-02' falls. In the present example, partition 104 is selected. The appropriate second-level partition is selected by determining which of second-level partitions 110, 112, 114, 116 and 118 is associated with the hash value produced by productid 769. Assuming that productid 769 hashes to hash value H1, partition 110 is selected. Having arrived at the lowest level of partitioning, the database server stores the row within partition 110.

Composite partitioning can significantly increase the number of statements on which partition pruning may be performed. Specifically, with conventional range and hash partitioning, only one partitioning key is used to partition an object. Consequently, only statements that select rows based on that particular partitioning key are candidates for partition pruning. With composite partitioning, multiple partitioning keys are used to partition an object, each at a different partitioning level. Statements that select rows based on any one of the multiple partitioning keys are candidates for partition pruning.

For example, assume that a statement selects rows from table 102 where "saledate=94-02-02". By inspecting the partitioning metadata associated with table 102, the database server determines that the selection criteria used in the statement uses the first-level partitioning key associated with table 102. Consequently, the database server performs partition pruning at the first level. In the present example, the database server determines that 94-02-02 falls within the range associated with first-level partition 104, and therefore excludes from the access plan the remainder of the first-level partitions (i.e. partitions 106 and 108).

On the other hand, a statement may select rows from table 102 where "productid=769". By inspecting the partitioning metadata associated with table 102, the database server determines that the selection criteria used in the statement uses the second-level partitioning key associated with table 102. Consequently, the database server performs partition pruning at the second level. In the present example, the database server determines that 769 hashes to hash value H1, associated with second-level partitions 110, 120 and 130, and therefore excludes from the execution plan of the query the remainder of the second-level partitions (i.e. partitions 112–118, 122–128 and 132–138).

A statement may even select rows from table 102 based on both partitioning keys. For example, a statement may select rows from table 102 where "saledate=94-02-02" and "productid=769". By inspecting the partitioning metadata associated with table 102, the database server determines that the selection criteria used in the statement uses the first and second-level partitioning keys associated with table 102. Consequently, the database server performs partition pruning at the first and second levels. In the present example, the database determines that 94-02-02 falls within the range associated with partition 104, and that 769 hashes to hash value H1, associated with the second-level partition 110 within partition 104. Therefore, the database server excludes from the execution plan of the query all partitions except partition 110.

Table 102 illustrates one example of composite partitioning, where the partitioning is performed at two levels, the partitioning technique (e.g. hash or range) is different at each level, and the partitioning key is different at each level. However, composite partitioning is not limited to those specifics. For example, a composite partitioned object may be partitioned at more than two levels, the partitioning technique may be the same at all levels (e.g. all hash or all range) or differ from level to level, and the various levels may or may not use the same partitioning key.

PARTITIONING IN SHARED DISK DATABASE SYSTEMS

Databases that run on multi-processing systems typically fall into two categories: shared disk databases and shared nothing databases. A shared nothing database assumes that a process can only access data if the data is contained on a disk that belongs to the same node as the process. Consequently, in a shared nothing database, work can only be assigned to a process if the data to be processed in the work resides on a disk in the same node as the process. To store data more evenly among the nodes in a shared nothing database system, large objects are often hash-partitioned into a number of hash buckets equal to the number of nodes in the system. Each partition is then stored on a different node.

A shared disk database expects all disks in the computer system to be visible to all processing nodes. Shared disk databases may be run on both shared nothing and shared disk computer systems. To run a shared disk database on a shared nothing computer system, software support may be added to the operating system or additional hardware may be provided to allow processes to have direct access to remote disks.

Unlike shared nothing database systems, in shared disk database systems, partitioning is not performed to distribute an object among nodes. Rather, because there is no tie between how an object is partitioned and the hardware configuration of the system, there are less constraints on how an object may be partitioned. According to one aspect of the invention, composite partitioning is performed in shared disk database systems in response to user-specified partitioning criteria. Specifically, a user specifies the partitioning criteria to be applied at each of the multiple levels of a composite partitioned object. For example, the following statement is an example of how a user may specify the creation of a table "sales" that has two levels of partitioning, where the first level is range-based partitioning based on saledate, and the second level is hash-based partitioning based on productid:

create table sales
      (saledate DATE,
      productid NUMBER, . . . )
      first-level partition by range (saledate)
        partition sal94Q1 values less than to_date (yy-mm-dd, '94-04-01')
        partition sal94Q2 values less than to_date (yy-mm-dd, '94-07-01')
        partition sal94Q3 values less than to_date (yy-mm-dd, '94-10-01')
        partition sal94Q4 values less than to_date (yy-mm-dd, '95-01-01')
      second-level partition by hash (productid)
      partitions 4;

The syntax used in the preceding statement is merely illustrative. The actual syntax of statements used to define composite partitioned objects may vary from implementation to implementation. The present invention is not limited to any particular syntax.

PARTITION-WISE JOINS

A join is a query that combines rows from two or more tables, views, or snapshots. A join is performed whenever multiple tables appear in a query's FROM clause. The query's select list can select any columns from any of the base tables listed in the FROM clause.

Most join queries contain WHERE clause conditions that compare two columns, each from a different table. Such a condition is called a join condition. To execute a join, the DBMS combines pairs of rows for which the join condition evaluates to TRUE, where each pair contains one row from each table.

In addition to join conditions, the WHERE clause of a join query can also contain other conditions that refer to columns of only one table. These conditions can further restrict the rows returned by the join query.

The following query includes a join between two tables, sales and product:

select * from sales, product
where sales.productid=product.productid

In this example, both tables contain columns named "productid". The join condition in the query causes rows in "sales" to join with rows in "product" when the productid value in the sales rows matches the productid value in the product rows. Using conventional join techniques, the database server performs the join by comparing every row in the sales table with every row in the product table. Whenever the productid value of the sales table row matches the productid value of a product row, the rows are combined and added to the result set of the join.

Figure 2:
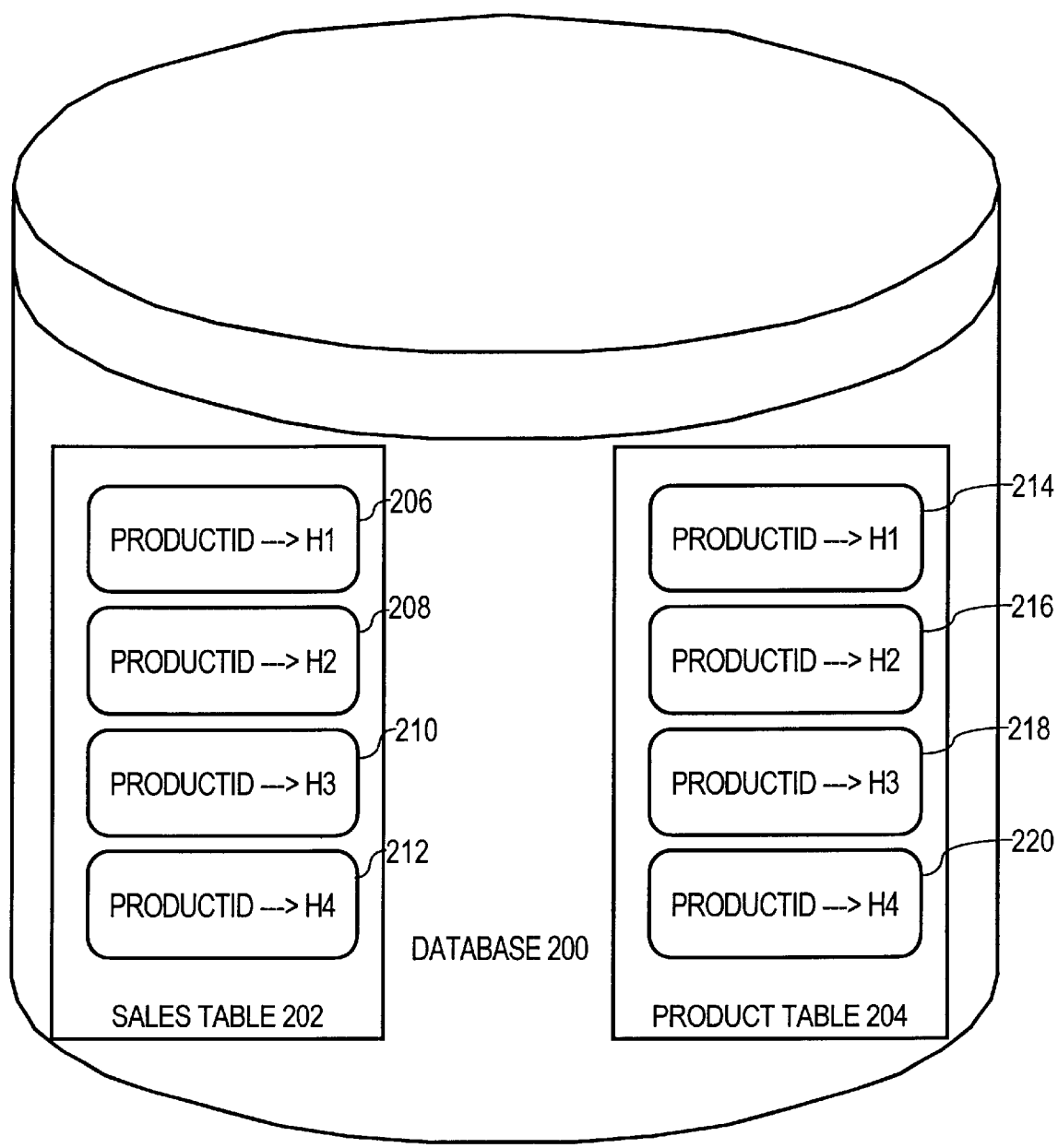
FIG. 2 is a block diagram illustrating tables partitioned in a manner that allows a full partition-wise join according to an embodiment of the invention.

According to one aspect of the invention, a technique is provided for performing joins more efficiently by taking advantage of the fact that one or more tables involved in a join is partitioned on the same key that appears in the join condition. For example, FIG. 2 illustrates a database 200 in which both a sales table 202 and a product table 204 are partitioned into four hash partitions, where productid is the partitioning key. In response to a query that joins tables 202 and 204 using productid as the join key, the database server need not compare every row in sales table 202 against every row in product table 204. Rather, the database server need only compare each row in the sales table 202 to the rows in one partition of product table 204. Specifically, a row in sales table 202 that hashes to a particular hash value need only be compared to rows in the partition of product table 204 associated with that same hash value. Thus, rows in partition 206 of sales table are only compared to rows in partition 214 of product table. Rows in partition 208 are only compared to rows in partition 216. Rows in partition 210 are only compared to rows in partition 218. Rows in partition 212 are only compared to rows in partition 220.

Joins performed on a partition by partition basis are referred to herein as partition-wise joins. Partition-wise joins may be performed when there is a mapping between the partitions of two partitioned objects that are to be joined, where the join key of the join is the partitioning key for the partitioned objects.

Partition-wise joins may be performed serially or in parallel. When performed serially, data from a partition of a first object is loaded into volatile memory and joined with the corresponding partition(s) of a second object. When that join has been performed, another partition of the first object is loaded into volatile memory and joined with the corresponding partition(s) of the second object. This process is repeated for each partition of the first object. The join rows generated during each of the partition-wise join operations are combined to produce the result-set of the join. Parallel partition-wise joins shall be described in detail below.

In the example shown in FIG. 2, the mapping between the partitions is one-to-one. However, partition-wise joins are possible when the mapping is not one-to-one. For example, assume that two tables T1 and T2 are partitioned based on salesdate, but that T1 is partitioned in ranges that cover individual months, while T2 is partitioned in ranges that cover quarters. Under these conditions, there is a many-to-one mapping between partitions of T1 and partitions of T2. In a partition-wise join, the T1 rows for a particular month are compared to the T2 rows in the partition that corresponds to the quarter that includes that particular month.

Partition-wise joins may even be performed where the boundaries of partitions of one table do not coincide with the boundaries of partitions of another table. For example, assume that T1 is partitioned into ranges that cover individual months, while T2 is partitioned into ranges that cover individual weeks. Some weeks span months. In a partition-wise join, the T1 rows for a particular month are compare to the T2 rows in the partitions that correspond to weeks that have at least one day in that particular month.

FULL PARALLEL PARTITION-WISE JOINS

One technique for performing a data manipulation operation in parallel is to divide the set of data that is to be manipulated into numerous subsets of data, and to distribute the subsets to a set of slave processes. In parallel with each other, the slave processes perform the required manipulation operation on the subsets of data assigned to them. The results produced by each slave are merged to produce the result set of the operation.

One technique for dividing a set of data into subsets, for distribution to slave processes, is through the use of a hash function. The hash function is applied on the rows of the table as part of the data manipulation operation to create the subsets of data. The subsets thus created are distributed to slave processes for parallel execution. Unfortunately, creating the subsets as part of the operation significantly increases the overhead of the operation.

According to one aspect of the invention, the overhead associated with performing a parallel data manipulation operation on a partitioned object is reduced by using the partitions of the object as the subsets of data for distribution to slave processes. For example, if the product table 204 is already partitioned as shown in FIG. 2, then operations on product table 204 may be performed in parallel by sending data from each of the partitions to a separate slave process.

When parallelizing join operations, the same hash function must be applied to each of the joined objects, where the join key of the join is the hash key used to divide the data into subsets. According to one aspect of the invention, when a join involves objects that have been partitioned using the same hash function, where the join key of the join is the hash key that was used to partition the objects, then the overhead associated with performing such joins is reduced by taking advantage of the pre-existing static partitions of the joined objects. For example, sales table 202 and product table 204 are partitioned on the same key (productid) using the same hash function. Thus, the existing partitions of tables 202 and 204 may be used as the subsets of data that are distributed to slave processes during execution of a join between tables 202 and 204, where "productid" is the join key. Parallel join operations in which the joined objects are partitioned in an identical manner based on the join key, where the data is divided and distributed based on the pre-existing static partitions, are referred to herein as full parallel partition-wise joins.

PARTIAL PARALLEL PARTITION-WISE JOINS

The need for both objects in a full parallel partition-wise join to be divided into subsets using the same criteria poses an obstacle to the use of pre-established static partitions to parallelize join operations. In particular, situations in which all joined objects happen to be statically partitioned in the same way based on the join key, such as was true for tables 202 and 204, are relatively rare. It is much more common for at least one of the joined objects to be (1) unpartitioned, (2) partitioned based on a different key, or (3) partitioned based on the same key but using a different hash function than the object with which it is to be joined.

For example, assume that a first table is partitioned into five hash partitions based on a particular key, and second table is partitioned into six hash partitions based on the same key. A join between the two tables using that key cannot be performed by distributing work based on the existing partitions. Specifically, there would be no logical correlation between the partitions of first table and the partitions of the second table. Hence, a row in any given partition of the first table could potentially combine with rows in any of the partitions of the second table.

According to one aspect of the invention, a technique is provided for reducing the overhead associated with performing a parallel join operation between objects where a first object is partitioned based on the join key and the second object is either unpartitioned, partitioned based on a different key, or partitioned based on the join key but using a different partitioning criteria than was used to statically partition the first object. The technique, referred to herein as a partial parallel partition-wise join, involves dynamically partitioning the second object using the same partitioning key and criteria as was used to create the preexisting static partitions of the first object. After the second object has been dynamically partitioned, the data from each partition of the first object is sent to a slave process along with the data from the corresponding dynamically created partition of the second object.

Figure 3:
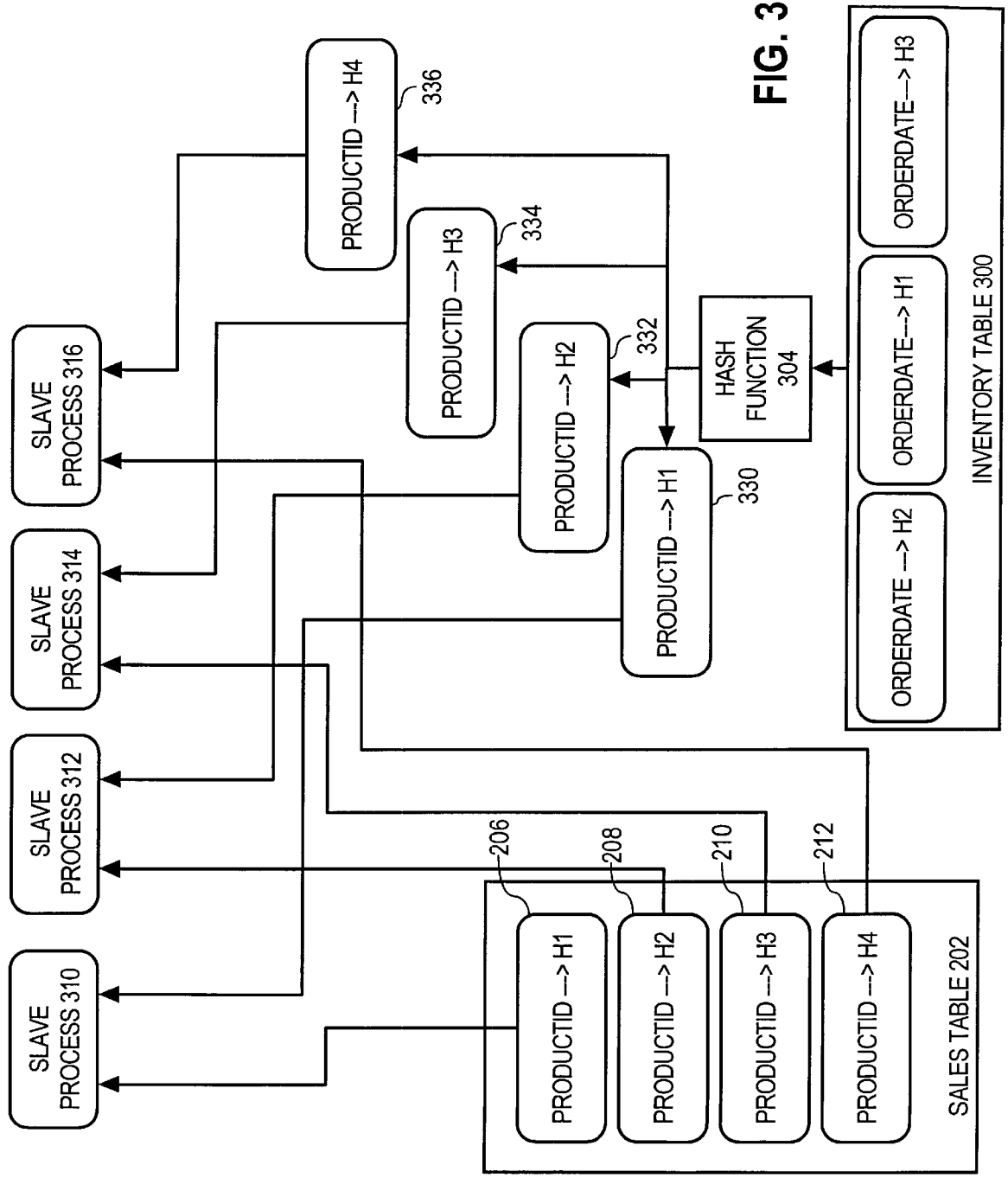
FIG. 3 is a block diagram illustrating tables involved in a partial parallel partition-wise join according to an embodiment of the invention.

Referring to FIG. 3, it illustrates the performance of a partial parallel partition-wise join between sales table 202 and an inventory table 300. Unlike tables 202 and 204, inventory table 300 is not partitioned into four hash partitions based on productid. Rather, inventory table 300 is partitioned into three partitions based on orderdate. A full parallel partition-wise join cannot be performed in response to a statement that joins sales table 202 with inventory table 300 based on productid because inventory table is not partitioned based on productid in the same manner as sales table 202. However, the overhead associated with the join operation may still be reduced by performing a partial parallel partition-wise join.

In the illustrated example, a partial parallel partition-wise join is performed by dynamically partitioning inventory table 300 using the same partition key and criteria that was used to partition sales table 202. Since partition table 202 is partitioned into four partitions based on productid, the same four-way hash function 304 used to partition sales table 202 is applied to the productid values with the rows of inventory table 300 to dynamically organize the rows of inventory table into four hash buckets 330, 332, 334 and 336. Each of the four hash buckets thus produced is sent, along with the partition of sales table 202 to which it corresponds, to a separate slave process for parallel execution. In the illustrated example, partition 206 and hash bucket 330 (both of which contains rows with productid values that hash to H1) are sent to slave process 310, partition 208 and hash bucket 332 (both of which contains rows with productid values that hash to H2) are sent to slave process 312, partition 210 and hash bucket 334 (both of which contains rows with productid values that hash to H3) are sent to slave process 314, and partition 212 and hash bucket 336 (both of which contains rows with productid values that hash to H4) are sent to slave process 316.

In the illustrated example of FIG. 3, the number of slave processes used to perform the partial parallel partition-wise join is equal to the number of partitions of sales table 202. However, this need not be the case. For example, the same join may be performed using fewer than four slave processes, in which case one or more of the slave processes would be assigned multiple partitions of sales table 202 along with the corresponding hash buckets produced from inventory table 300. On the other hand, the number of slave process available to perform the parallel join operation may exceed the number of partitions into which the objects have been divided. When the desired degree of parallelism exceeds the number of partitions of the statically-partitioned object, a hash function may be applied to one or more of the partition/hash bucket pairs to divide the partition/hash bucket data into multiple, smaller work granules. For example, a two way hash function may be applied to partition 206 and hash bucket 330, where rows from one of the two hash buckets thus produced would be processed by slave process 310, and rows from the other of the two hash buckets would be processed by a fifth slave process (not shown).

According to one embodiment of the invention, the process of dynamically partitioning one object in the same manner as a statically partitioned object during a partial parallel partition-wise join is itself distributed among slave processes for parallel execution. For example, each of four slave processes may be assigned to scan portions of inventory table 300. Each of the four slaves applies the hash function 304 to the rows that it scans, and adds the rows to the appropriate hash bucket. The process of adding a row to a hash bucket may involve, for example, transmitting the row to the slave process that, at the next phase of the partial parallel partition-wise join, is responsible for handling rows from that hash bucket. For example, a hash-operation slave may add a row to the hash bucket for H1 by sending the row to slave process 310.

Frequently, the slave process that is responsible for determining the hash bucket for a particular row is on a different node than the slave process that is responsible for joining rows from that hash bucket. Consequently, the transmission of the row from one slave to the other often involves inter-node communication, which has a significant impact on performance. Thus, a significant benefit achieved by partial parallel partition-wise joins is that data from only one of the two objects involved in the join is dynamically partitioned, and therefore may require inter-node transmission. Rows from the statically partitioned object, on the other hand, may simply be loaded from disk directly into the node on which resides the slave process responsible for processing the partition in which the rows reside. The larger the statically-partitioned object, the greater the performance gain achieved by avoiding the inter-node transmission of data from the statically-partitioned object.

NON-TABLE OBJECTS

In the embodiments described above, the objects being joined are tables. However, the present invention is not limited to joins between tables. For example, a partial parallel partition-wise join may be performed when the statically partitioned object is an index, and the object with which the index is joined is a table.

PARTIAL PARALLEL PARTITION-WISE JOINS OF COMPOSITE PARTITIONED OBJECTS

When the statically-partitioned object in a partial parallel partition-wise join is an object that has been partitioned using composite partitioning, multiple different partitioning criteria may be available for use in the join. For example, a statically partitioned object (SPO) may be partitioned at the first level using range-based partitioning on the join key, and at a second level using hash-based partitioning on the join key. Under these conditions, it is possible to perform a partial parallel partition-wise join with another object (DPO) by dynamically partitioning DPO either based on the same range-based partitioning criteria that was used to perform the first level partitioning of SPO, or based on the same hash function that was used to perform the second level partitioning of SPO.

Typically, when choosing the partitioning technique to use to distribute work for a parallel operation, hash-based partitioning is generally preferred over range-based partitioning because of the reduced likelihood of skew. Because hash-based partitions are less likely to exhibit skew, it is more likely that slave processes assigned work based on hash-buckets will be responsible for approximately the same amount of work, and therefore will finish their tasks at approximately the same time.

PARTIAL PARALLEL PARTITION-WISE JOINS WITH PRUNING

When the statically-partitioned object in a partial parallel partition-wise join is an object that has been partitioned using composite partitioning, it may be possible to perform partition pruning based on a different level of partitioning than is used to distribute the data during the partial parallel partition-wise join. For example, assume that a query specifies a join between table 102 illustrated in FIG. 1 and a non-partitioned table NPT, where the join key is productid. However, in addition to the join condition, the query includes the condition "saledate<94-05-01". Under these conditions, the database server performs partition pruning on the first-level partitions 104, 106 and 108 of table 102 based on the "saledate<94-05-01" condition. In the current example, during the partition pruning the database server would eliminate from consideration partition 108, which is associated with a saledate range that could not possibly satisfy the "saledate<94-05-01" condition.

After pruning has been performed based on first-level partitions 104, 106 and 108, parallel distribution of work can be performed based on the second-level hash partitions. That is, slave processes are assigned work on a per-hash-bucket basis, where the hash buckets are produced by the hash function used to perform the second-level partitioning of table 102. For the purpose of explanation, it shall be assumed that five slave processes are to be used to perform the join between table 102 and table NPT. Consequently, each of those five processes will be assigned the data associated with a particular hash value.

Only those second-level hash partitions that remain after pruning are distributed to slave processes. In the present example, first-level partition 108 was pruned. Consequently, the data in the second-level hash partitions 130, 132, 134, 136 and 138 that reside in partition 108 is not distributed to the slave processes. Of the second level-partitions that belong to the remaining first-level partitions 104 and 106:

the second-level partition 110 of partition 104 that is associated with hash value H1, and the second-level partition 120 of partition 106 that is associated with hash value H1, are both assigned to a first slave process, the second-level partition 112 of partition 104 that is associated with hash value H2, and the second-level partition 122 of partition 106 that is associated with hash value H2, are both assigned to a second slave process, the second-level partition 114 of partition 104 that is associated with hash value H3, and the second-level partition 124 of partition 106 that is associated with hash value H3, are both assigned to a third slave process, the second-level partition 116 of partition 104 that is associated with hash value H4, and the second-level partition 126 of partition 106 that is associated with hash value H4, are both assigned to a fourth slave process, the second-level partition 118 of partition 104 that is associated with hash value H5, and the second-level partition 128 of partition 106 that is associated with hash value H5, are both assigned to a fifth slave process.

During execution of the partial parallel partition-wise join between table 102 and NPT, NPT is dynamically partitioned using the same hash function as was used to create the static second-level partitions of table 102. The application of the hash function to NPT produces five hash buckets, where rows from the hash buckets associated with hash values H1, H2, H3, H4 and H5 are respectively sent to the first, second, third, fourth and fifth slave processes.

In the example given above, pruning was done based on the first-level partitioning of a composite partitioned object, while data distribution to slave processes was done based on the second-level partitioning. However, any level or levels of a composite partitioned object may be used for pruning, and any level may be used for parallel data distribution. For example, pruning may be performed using partition levels two, five, six and eight of an eight-way partitioned object, while any one of the eight partitions may be used for distributing the data to slave processes during a parallel join operation. Further, the partition level used to distribute the data need not be a hash-partitioned level, but may, for example, be a range-partitioned level.

HARDWARE OVERVIEW

Figure 4:
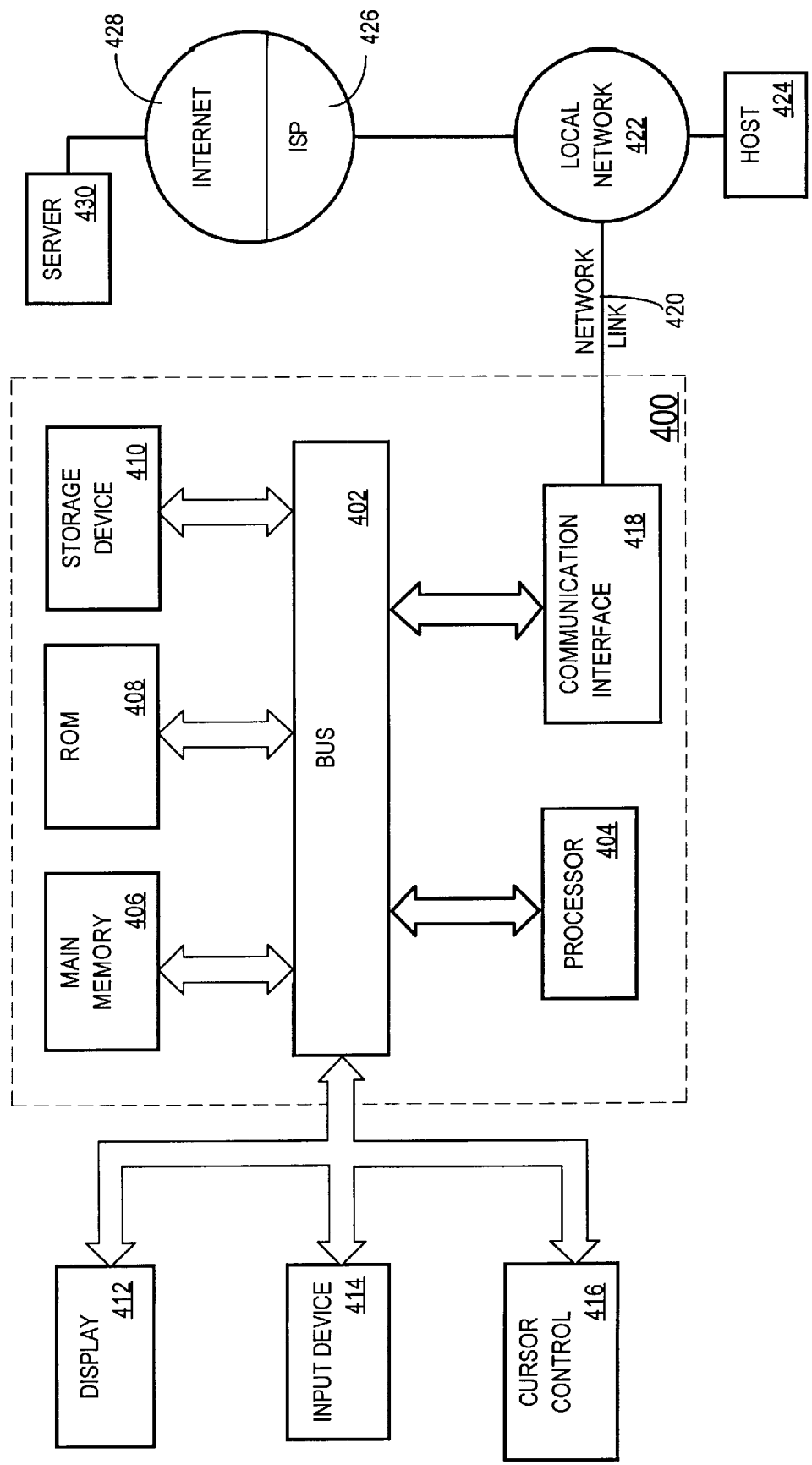
FIG. 4 is a block diagram illustrating a computer system on which embodiments of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for partitioning, partition pruning and performing partition-wise joins according to the techniques described herein. According to one embodiment of the invention, those techniques are implemented by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. The received code may be executed by processor 404 as it is received, and/or stored in storage device 410, or other non-volatile storage for later execution. In this manner, computer system 400 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for processing a statement that specifies a join between a first object and a second object based on a join key, the method comprising the steps of:

performing multi-level static partitioning of the first object, including performing the steps of:
statically partitioning the first object at a first level by applying a first partitioning criteria to the first object to produce a first set of partitions; and
statically partitioning the first object at a second level based on said join key, wherein the static partitioning based on said join key is performed by applying a second partitioning criteria to each partition in said first set of partitions to produce a second set of partitions;

during execution of said statement, using the second level of static partitioning of said first object as a basis for distributing data of said first object, including performing the steps of:
inspecting partitioning metadata based on said statement to determine that the second level of static partitioning of said first object, and not said first level of static partitioning, should be used as a basis for distributing data from said first object to a plurality of slave processes;
distributing data from said first and second objects to each slave process of said plurality of slave processes based on said second partitioning criteria, including distributing to each slave process of said plurality of slave processes a first subset of data from said first object, wherein the first subset of data that is distributed to each slave process is established based on said second set of partitions;

distributing to each slave process of said plurality of slave processes a second subset of data from said second object, wherein the second subset of data that is distributed to each slave process is established based on said second partitioning criteria; and causing each slave process of said plurality of slave processes to perform a join between the first subset of data assigned to the slave process and the second subset of data assigned to the slave process.

2. The method of claim 1 wherein:

the second object is statically partitioned based on the second partitioning criteria; and no dynamic partitioning is performed to establish the first and second subsets of data that are distributed to each slave process.

3. The method of claim 1 wherein:

the second object is not statically partitioned based on the second partitioned criteria; and the method further comprises the step of, in response to said statement, dynamically partitioning the second object based on the same partitioning criteria used to statically partition said first object.

4. The method of claim 1 wherein the method further includes the step of establishing said first and second subsets of data to distribute to each slave process based on said second partitioning criteria.

5. The method of claim 1 wherein the method further includes the steps of:

performing partition pruning based on one partitioning criteria of said first partitioning criteria and said second partitioning criteria; and establishing said first and second subsets of data to distribute to each slave process based on the other partitioning criteria of said first partitioning criteria and said second partitioning criteria.

6. A computer readable medium bearing instructions for processing a statement that specifies a join between a first object and a second object based on a join key, the instructions including instructions for performing the steps of:

performing multi-level static partitioning of the first object, including performing the steps of:

statically partitioning the first object at a first level by applying a first partitioning criteria to the first object to produce a first set of partitions; and statically partitioning the first object at a second level based on said join key, wherein the static partitioning based on said join key is performed by applying a second partitioning criteria to each partition in said first set of partitions to produce a second set of partitions;

during execution of said statement, using the second level of static partitioning of said first object as a basis for distributing data of said first object, including performing the steps of:

inspecting partitioning metadata based on said statement to determine that the second level of static partitioning of said first object, and not said first level of static partitioning, should be used as a basis for distributing data from said first object to a plurality of slave processes;

distributing data from said first and second objects to each slave process of said plurality of slave processes based on said second partitioning criteria, including distributing to each slave process of said plurality of slave processes a first subset of data from said first object, wherein the first subset of data that is distributed to each slave process is established based on said second set of partitions;

distributing to each slave process of said plurality of slave processes a second subset of data from said second object, wherein the second subset of data that is distributed to each slave process is established based on said second partitioning criteria; and causing each slave process of said plurality of slave processes to perform a join between the first subset of data assigned to the slave process and the second subset of data assigned to the slave process.

7. The computer readable medium of claim 6 wherein:

the second object is statically partitioned based on the same partitioning criteria used to statically partition said first object, and no dynamic partitioning is performed to establish the first and second subsets of data that are distributed to each slave process.

8. The computer readable medium of claim 6 wherein:

the second object is not statically partitioned based on the same partitioning criteria used to statically partition said first object; and the instructions further include instructions for performing the step of, in response to said statement, dynamically partitioning the second object based on the same partitioning criteria used to statically partition said first object.

9. The computer readable medium of claim 6 wherein the instructions further include instructions for performing the step of establishing said first and second subsets of data to distribute to each slave process based on said second partitioning criteria.

10. The computer readable medium of claim 6 wherein the instructions further include instructions for performing the steps of:

performing partition pruning based on one partitioning criteria of said first partitioning criteria and said second partitioning criteria; and establishing said first and second subsets of data to distribute to each slave process based on the other partitioning criteria of said first partitioning criteria and said second partitioning criteria.

* * * * *

UNITED STATES PATENT AND TRADEMARK OFFICE
CERTIFICATE OF CORRECTION

PATENT NO.    : 6,609,131 B1
DATED         : August 19, 2003
INVENTOR(S)   : Zait et al.

It is certified that error appears in the above-identified patent and that said Letters Patent is hereby corrected as shown below:

Column 15,
Line 25, "partitioned," should read -- partitioning --;
Lines 28-29, "same partitioning criteria used to statically partition said first object," should read -- second partitioning criteria. --;

Column 16,
Lines 30-31, "same partitioning criteria used to statically partition said first object, and," should read -- second partitioning criteria, and --;
Line 37, "same" should read -- second --;
Line 41, "same" should read -- second --;
Lines 42-43, "partitioning criteria used to statically partitioned said first object." should read -- partitioning criteria --.

Signed and Sealed this

Second Day of December, 2003

JAMES E. ROGAN
*Director of the United States Patent and Trademark Office*